May 6, 1941.  G. H. FISCHER  2,240,840
TAP CONSTRUCTION
Filed Oct. 13, 1939
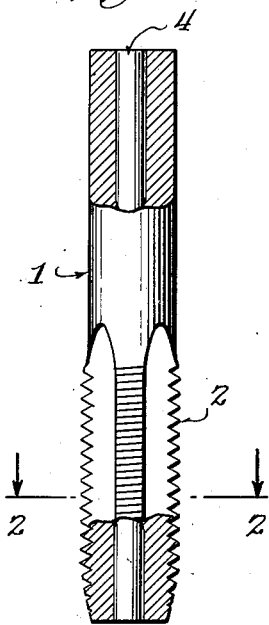
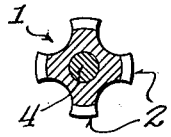
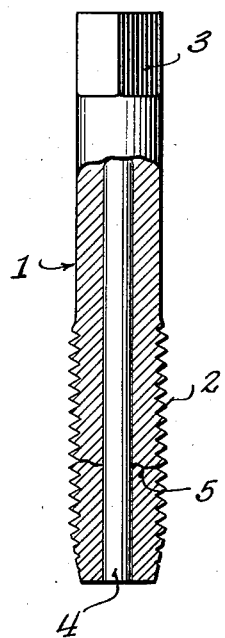
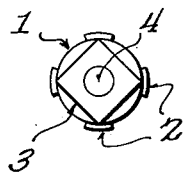
INVENTOR.
Gordon H. Fischer
BY
Louis Quarles
ATTORNEY.

Patented May 6, 1941

2,240,840

UNITED STATES PATENT OFFICE 2,240,840

TAP CONSTRUCTION

Gordon H. Fischer, Milwaukee, Wis.

Application October 13, 1939, Serial No. 299,231

6 Claims. (Cl. 10—141)

This invention relates to taps and reamers and other long slender tools which are subjected to torsion and which have cutting edges along the sides thereof and it resides in a novel and highly useful addition to the structure thereof, which greatly diminishes the damage to the work which frequently results when such tools break under usage.

When a tap, for example, of the conventional form heretofore in use breaks off in the work, the removal of the broken piece from the work often presents a serious problem. Often the broken piece is so far within the work that it is impossible to back it out by turning it. When such is the case, drastic measures must be employed. For example, if the tap is made of ordinary carbon tool-steel it may be heated with a gas torch until it is annealed, after which it is possible to remove the broken piece by drilling. At the present time, however, many tools are constructed of so-called high-speed alloys which cannot be annealed by any ordinary method and the removal of a broken part of a tap of such material by drilling is out of the question. At times a broken part of a high-speed tap becomes so lodged in the work that it is necessary to cut away the surrounding work with a cutting-torch in order to remove the broken piece, after which the portion cut away must be filled in by welding, followed by expensive machining. Little success has been experienced in attempting to render taps and the like less subject to breakage by case-hardening or other methods which would produce a tough center and a hard case due to the fact that cracking which may readily start in the hard outer case will nevertheless travel through the tough central part of the tap, due to the intimate bond between the case and the core and, further, it is hard to obtain a case of the proper compositon to withstand the conditions imposed upon a cutting tool.

The tap, or similar tool, of this invention, however, may be composed of any alloy desired and, further, is so constructed that if a crack in the tool occurs such crack will not result in separation of the parts of the tap and withdrawal of the broken part from the work can be effected with simplicity.

The tool of this invention is herein illustrated and described by reference to the accompanying drawing wherein one suitable form of the tool of this invention is set forth by way of illustration and not of limitation.

In the drawing, Fig. 1 is a side elevation of a tap constructed in accordance with this invention, parts thereof being shown in section;

Fig. 2 is a plan view, in section, of the tap shown in Fig. 1 viewed through the plane 2—2 of Fig. 1;

Fig. 3 is a plan view of the top of the tap shown in Fig. 1; and

Fig. 4 is a side elevation, in section, of the tap shown in Fig. 1, shown in the typical condition which may result in case of breakage of the tap.

As shown in the drawing, the tap of this invention is provided with a body 1, which is in conventional form, being provided with flutes 2 having thread-cutting surfaces formed therein. The usual polygonal head 3 formed in the body 1 is employed, through which the necessary torsion for driving the tap is applied. A bore, centered within the body 1 and running longitudinally throughout its length, is provided and into the bore there is inserted a tough mild-steel or bronze core 4. The core 4 is dimensioned to fit the longitudinal bore with a very tight fit and may be inserted therein by driving or pressing, or by shrinking the core 4 by abnormally low temperature before inserting the same, or by heating the tap before inserting the core and then shrinking the tap in place around the core.

By so constructing the tool of this invention, little or no torsion is carried by the central core and for this reason fracture of the central core due to torsion cannot occur. On the other hand, if the tap should break, for example as indicated by the crack 5 in Fig. 4, the broken parts of the tap will be held intact to a sufficient extent to permit removal of the broken tap from the work. The tight fit between the core 4 and the body 1 facilitates this operation and permits the core to transmit to the broken part sufficient torque for its removal. If, on the other hand, the broken piece of the tap is more stubbornly lodged than normally occurs in case of breakage and the torque transmittable through the core 4 is inadequate to back the broken part out of the work, the core 4 may be withdrawn, whereupon the broken piece becomes greatly weakened against collapsing pressures and a drift may then be driven between the flutes 2 to demolish the broken piece of the tap. Under such conditions it is easy to break the fragment of the tap into four small pieces, which can be removed separately with tweezers.

It will be observed that in a tap of this invention there is no surface bond between the central core 4 and the body 1. The surface of discontinuity between these two parts is important, since it insures that a crack originating in the body 1 will be confined thereto and will not travel through the core 4. There is, therefore, a marked difference between the tool of this invention and tools which employ a case-hardened body with a tough central portion.

While this invention has been herein described by reference to one embodiment thereof, it is intended that the protection of Letters Patent to be granted hereon be not unnecessarily limited thereby, but that such protection extend to the full limit of the inventive advance disclosed herein as set forth in the claims hereto appended.

What I claim as my invention is:

1. In a tool of the class described, the combination comprising a relatively long and slender tool body composed of hard material suitable for cutting, means to which torsion may be applied at one end thereof, cutting surfaces surrounding the sides of said body, and a separate relatively tough core disposed within and tightly engaging a central opening running longitudinally through said body.

2. In a tool of the class described, the combination comprising a relatively long and slender tool body composed of hard steel suitable for cutting, means to which torsion may be applied at one end thereof, cutting surfaces surrounding the sides of said body, and a separate relatively tough core disposed within and tightly engaging a central opening running longitudinally through said body.

3. In a tool of the class described, the combination comprising a relatively long and slender body composed of hard material suitable for cutting, means to which torsion may be applied at one end thereof, cutting surfaces surrounding the sides of said body, and a separate core of tough mild-steel disposed within and tightly engaging a central opening running longitudinally through said body.

4. In a cutting tool adapted to cut through application of torsion, a tubular member of hard relatively brittle cutting material having a cutting portion provided with cutting faces along the sides near one end, a driving portion provided with means to which torsion may be applied at the opposite end and a shank portion connecting the cutting portion with the means for applying torsion, said tubular member having a central longitudinal bore running lengthwise substantially throughout its length, and a central core of relatively tougher material positioned within said bore in tightly fitting engagement therewith.

5. In a tap for cutting internal threads, a tubular member of hard relatively brittle cutting material having a cutting portion provided with serrated thread-cutting faces along the sides near one end, a driving portion provided with means to which torsion may be applied at the opposite end and a shank portion connecting the cutting portion with the means for applying torsion, said tubular member having a central longitudinal bore running lengthwise substantially throughout its length, and a central core of relatively tougher material positioned within said bore in tightly fitting engagement therewith.

6. In a tap for cutting internal threads, a tubular member of relatively hard and brittle tool steel having a cutting portion provided with serrated thread-cutting ridges extending along the sides near one end, a polygonal head to which torsion may be applied at the opposite end and a shank portion connecting said head and cutting portions, said tubular member having a central longitudinal bore running lengthwise substantially throughout its length, and a central core of mild relatively tougher steel positioned within said bore in tightly fitting engagement therewith.

GORDON H. FISCHER.